United States Patent [19]

Viens

[11] Patent Number: 5,331,871
[45] Date of Patent: Jul. 26, 1994

[54] METHOD OF TURNING GROOVES
[75] Inventor: Daniel V. Viens, Coventry, Conn.
[73] Assignee: Carrier Corporation, Syracuse, N.Y.
[21] Appl. No.: 991,605
[22] Filed: Dec. 16, 1992
[51] Int. Cl.[5] .................................................. B23B 1/00
[52] U.S. Cl. ........................................ 82/1.11; 82/1.12
[58] Field of Search ................................. 82/1.11, 1.12

[56] References Cited
U.S. PATENT DOCUMENTS

| | | | |
|---|---|---|---|
| 4,434,581 | 3/1984 | Spriggs | 51/67 |
| 4,620,463 | 11/1986 | Horn et al. | 82/1.11 |
| 4,655,105 | 4/1987 | Maxwell et al. | 82/1.11 |
| 4,759,243 | 7/1988 | Thompson | 82/1.11 |
| 4,779,318 | 10/1988 | Henderson | 29/38 B |
| 4,928,561 | 5/1990 | Fouche | 82/1.11 |
| 5,003,851 | 4/1991 | Kawada et al. | 82/1.11 |
| 5,022,797 | 6/1991 | Sawa et al. | 407/119 |
| 5,050,468 | 9/1991 | Nydigger | 82/1.11 |
| 5,152,060 | 10/1992 | Schubert et al. | 29/890.039 |

OTHER PUBLICATIONS

Marks' Standard Handbook for Mechanical Engineers Ed. Avallone & Baumeister McGraw-Hill 1978 pp. 13-48 to 13-59.

Primary Examiner—William E. Terrell

[57] ABSTRACT

A method of turning very small grooves into a hardened steel work piece using a precision or ultraprecision lathe. Positioning of the work piece on the lathe spindle and dressing the work piece to minimize runout, aligning the cutting tool with the face of the work piece to be grooved, the lathe cutting speed and the cutting tool feed rate are all precisely controlled in order to maintain the forces acting on the cutting tool to levels below which fracture of the tool will occur. The cutting tool has a specially configured tip of a cubic boron nitride material.

3 Claims, 5 Drawing Sheets

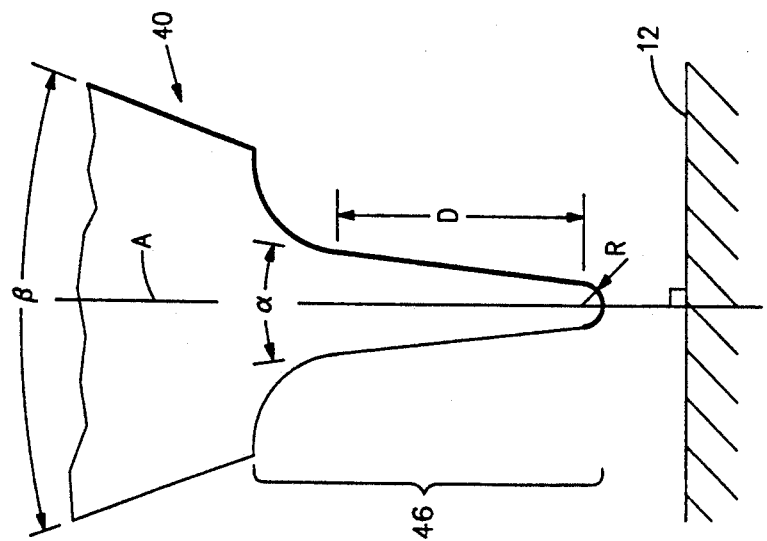
FIG.7
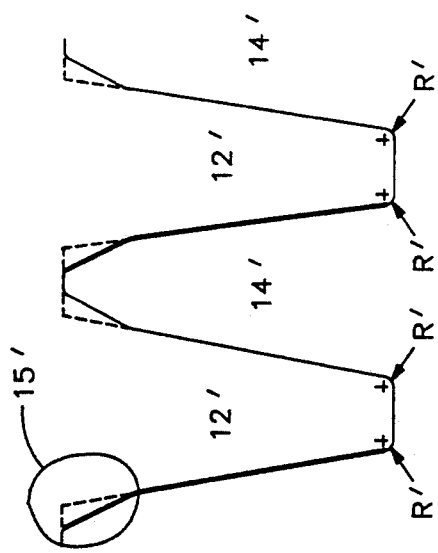
FIG.4 Prior Art
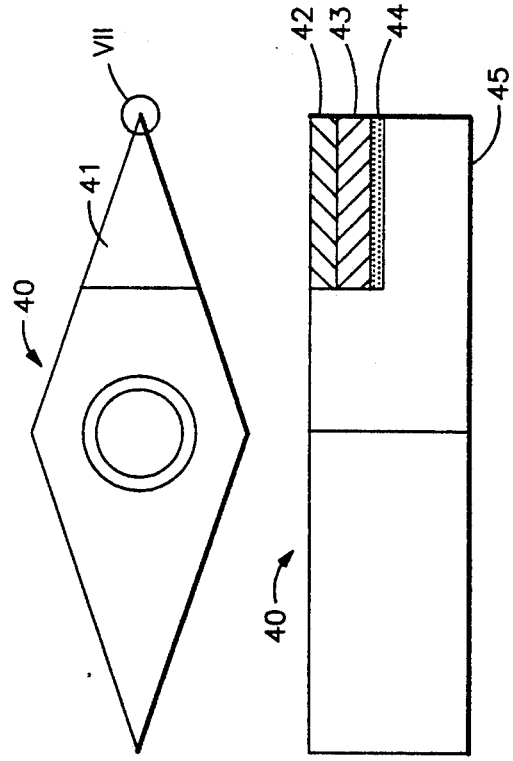
FIG.5
FIG.6

METHOD OF TURNING GROOVES

BACKGROUND OF THE INVENTION

This invention relates generally to the field of working metal by lathe turning. More particularly, the invention encompasses a method for cutting extremely small grooves in hard tool steel.

The requirement to cut small grooves in a turning blank of hard tool steel may arise in a variety of applications. One such application is in the manufacture of heat exchanger tubing. Either one or both of the surfaces of such tubing is frequently configured with, for example, a pattern of ribs or fins in order to provide an enhancement in heat transfer performance over tubing having smooth surfaces. One such type of an enhancement is a pattern of longitudinal ribs on the internal surface of the tubing. This type of enhancement readily adapts itself to use in a manufacturing process in which flat metal strip is roll formed into a cylindrical shape with the resultant longitudinal seam being welded to form the tubing. A surface enhancement embossing step can be added to the roll forming and welding process so that the pattern of longitudinal ribs can be formed on the flat strip before it is roll formed and welded into a finished tube. Modern equipment and techniques enable the manufacture of quantities of tubing at extremely high speeds by this process.

To form the ribs, the metal strip is pressed between two rollers. At least one of the rollers has a pattern of grooves that is the mirror image of the rib pattern to be embossed into the strip. Under the pressure exerted by the two rollers, strip metal, usually copper, flows into the grooves to form the ribs of the enhancement pattern. The width of the metal strip needed to form tubing of the size commonly used in refrigerant-to-air heat exchangers in air conditioning and refrigeration systems is about 3 cm. On a strip this width will be embossed a surface enhancement comprising somewhere in the range of 70 to 80 ribs, each rib having a height on the order of 0.25 mm. The ribs are thus relatively very small. It follows that the size of the grooves in the embossing roller is correspondingly very small.

To withstand wear, the embossing rollers must be made of a very hard material such as a tool steel. When in operation, there are not only compression forces acting on the grooved embossing wheel but also shear forces acting on the metal between adjacent grooves on the roller. For this reason, the metal of the roller must also be very tough and the configuration of the grooves must be such as to reduce the incidence of localized concentrations of stress in the metal between the grooves of the roller. There should be a high degree of uniformity in the planforms of the individual grooves in the grooved embossing roller.

Forming grooves of the desired size and shape in a metal hard enough and tough enough to be suitable for an embossing roller presents unique challenges. One method of forming grooves is by grinding them in to the roller with a suitable abrasive wheel. This is a time consuming and therefore expensive task. One reason for the time required is that the abrasive wheel must be relatively frequently dressed up. Otherwise, the uniformity of the grooves is degraded because of abrasive wheel wear. In addition, one is not able to achieve certain specific groove configurations because of limitations in the grinding art.

What is needed is a method of forming very small grooves in a very hard and very tough tool steel blank. The method should be capable of forming grooves of a variety of cross sections and not be excessively time consuming.

SUMMARY OF THE INVENTION

The present invention is a method of forming very narrow, on the order of the width of a human hair, grooves in a hard tool steel blank by lathe turning. Before the development of this method, it was generally believed among those skilled in the art that it was not possible to turn grooves of that size in hard steels without breaking the very small cutting tool necessary. The method combines advances in machine turning and cutting tool technologies as well as metallurgy with simple but extremely painstaking accuracy to enable the lathe cutting of grooves in the blank. The method allows formation of grooves comparatively rapidly and therefore leads to an overall reduction in the cost of a finished embossing wheel.

As will be disclosed in the below detailed description, the method includes the use of a turning blank comprised of a very hard steel alloy. The lathe used is of the precision or ultraprecision type. In this type of machine it is possible, to accuracies on the order of a few microns ($\mu$m) or less, to very precisely position and rotate the turning blank as well as to very precisely control the position of the cutting tool with respect to the turning blank. The cutting tool has a very hard and tough cubic boron nitride (CBN) tip that is prepared to precisely the desired configuration of the groove to be turned into the blank. The turning blank is positioned in the lathe and dressed to minimize or eliminate, to accuracies only possible using a precision or ultraprecision lathe, runout. The cutting tool, also to accuracies only possible on a precision or ultraprecision lathe, is positioned, with respect to the surface of the blank to be grooved, so that side loads on the tool will be at a minimum during cutting operations. The rotational speed of the lathe is precisely controlled so that the linear speed of the work past the cutting tool is within a predetermined optimum range of values. And the feed rate of the cutting tool into the work is precisely controlled so that it is within a predetermined optimum range of values.

BRIEF DESCRIPTION OF THE DRAWINGS

The accompanying drawings form a part of the specification. Throughout the drawings, like reference numbers identify like elements.

FIG. 4 is a diagram of a groove form cut in to an embossing wheel by a prior art method.

FIG. 5 is a top plan view of a cutting tool used in the method of the present invention.

FIG. 6 is a side elevation view of a cutting tool used in the method of the present invention.

FIG. 7 is a detailed plan view of the tip of the cutting tool depicted in FIG. 5.

DESCRIPTION OF THE PREFERRED EMBODIMENT

Figure 1:
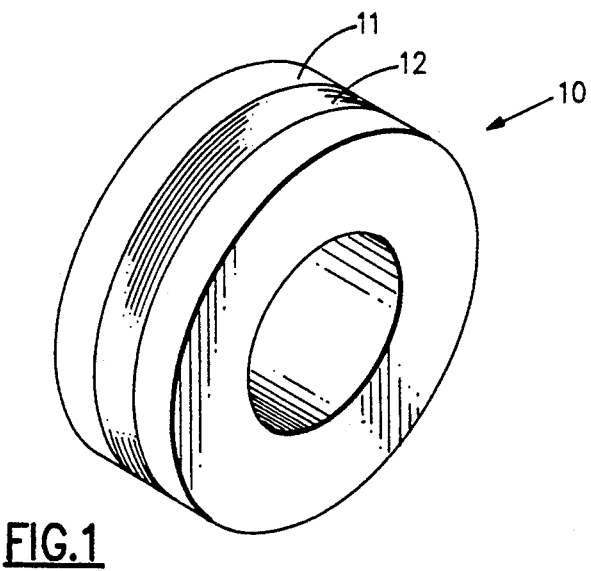
FIG. 1 is an isometric view of an embossing roller having a grooved region produced by the method of the present invention.
Figure 2:
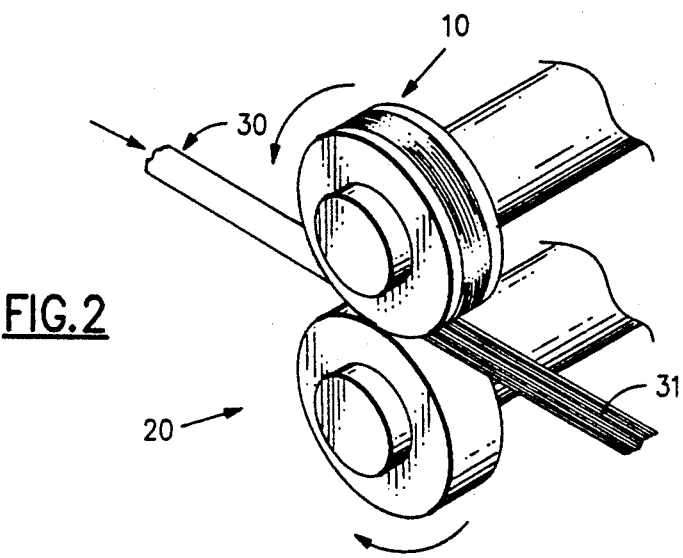
FIG. 2 is an isometric view of a rolling station where longitudinal ribs are roll embossed into a metal strip.
Figure 3:
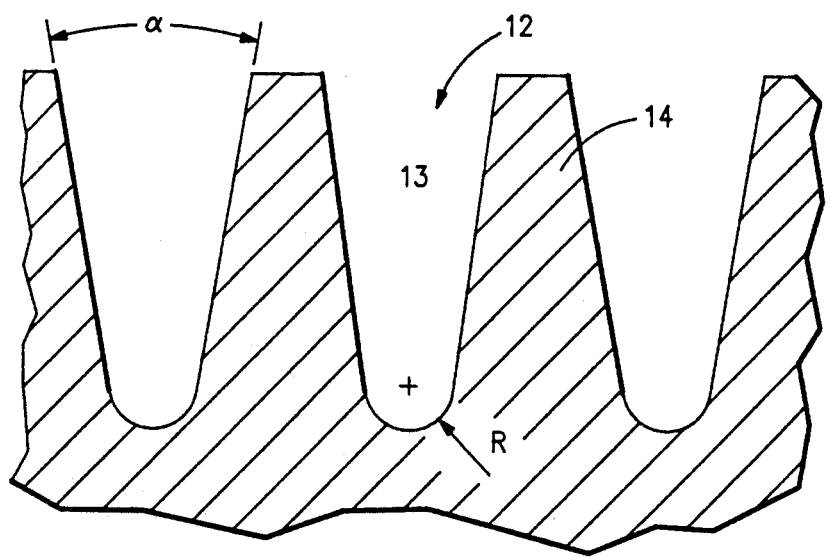
FIG. 3 is a diagram of a typical groove from to be cut in to an embossing wheel by the method of the present invention.

FIGS. 1, 2 and 3 illustrate one application for the method of the present invention. FIG. i depicts embossing roller 10. Centrally located on circumferential surface 11 of roller 10 is working zone 12. FIG. 2 shows embossing roller 10 installed and operating at a roll embossing station in a heat exchanger tube manufacturing line. Working zone 12 comprises a number of parallel circumferential grooves 13 as depicted in cross section in FIG. 3. Copper strip 30 from a strip supply (not shown) passes between embossing wheel 10 and backing roller 20. Rollers 10 and 20 have a tangential distance between them that is less than the thickness of strip 30, so that metal in the strip is forced into grooves 13 in working zone 12 as the strip passes between the rollers. This produces a pattern of longitudinal ribs in enhancement region 31 on strip 30. Further steps in the tube manufacturing process (not shown) include roll forming the strip into a tubular configuration and welding the seam formed between the two joined edges of the strip.

In one example of a strip roll embossed in the manner described above, there are over 70 ribs in the approximately three centimeter wide enhancement region. Each groove 13 is therefore very narrow and the grooves are very closely spaced. Walls 14 between adjacent grooves are therefore also very narrow. Strip rolling operations impose very high lateral stresses in the metal of walls 14. The possibility of stress cracking in the groove walls is reduced if radius R of the base of the groove is as large as other desired dimensions of the groove will permit.

The prior art method of forming very small grooves in a metal turning blank, i.e. by abrasive grinding, is not capable of forming grooves having completely rounded groove bottoms. FIG. 4 depicts the cross section of grooves 12' formed by grinding and shows that the bottom of the groove is flattened with smaller radii R' of curvature on each side of the groove bottom. Because of these smaller radii, the areas at the edges of the base of the groove serve as stress raisers and increase in the possibility of failure by cracking in walls 14'. The prior art grinding method is also not capable of producing a sharply defined shoulder but rather only a chamfered or rounded shoulder 15' at the top of the groove. Furthermore, the grinding wheel used in grinding the grooves is subject to loss of its shape due to wear. As the wheel wears, the shape of the grooves it cuts changes unless the operator dresses up the wheel frequently.

The practice of the method of the invention requires the use of the precision or ultraprecision lathes that are now available. A precision lathe is capable of accuracies in setting up the work and positioning a cutting tool to accuracies of on the order of five to ten microns and a spindle runout accuracy on the order of less than one micron. An ultraprecision lathe has the capability of similar accuracies on the order of less than one half micron and less than a tenth of a micron. An ordinary metal tool making lathe, by comparison, has a runout accuracy of five to eight microns respectively. Runouts in this latter range can cause changes in cutting forces sufficient to cause failure of the cutting tool. Only with the higher precision lathes can spindle runout be sufficiently minimized and the cutting tool be positioned with respect to the work with sufficient accuracy to allow the practice of the invention.

Figure 8:
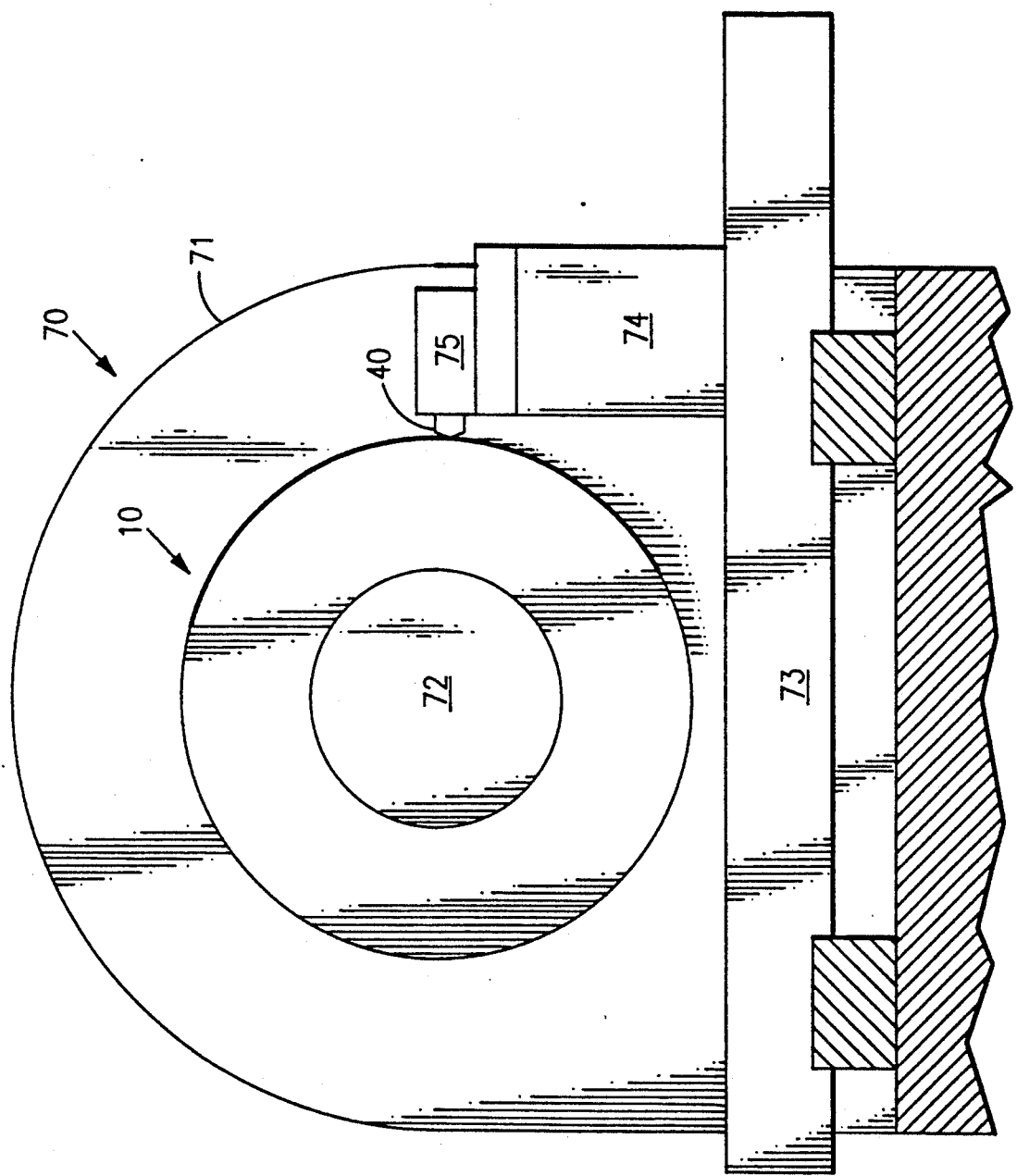
FIG. 8 is a side elevation view of a portion of a lathe.
Figure 9:
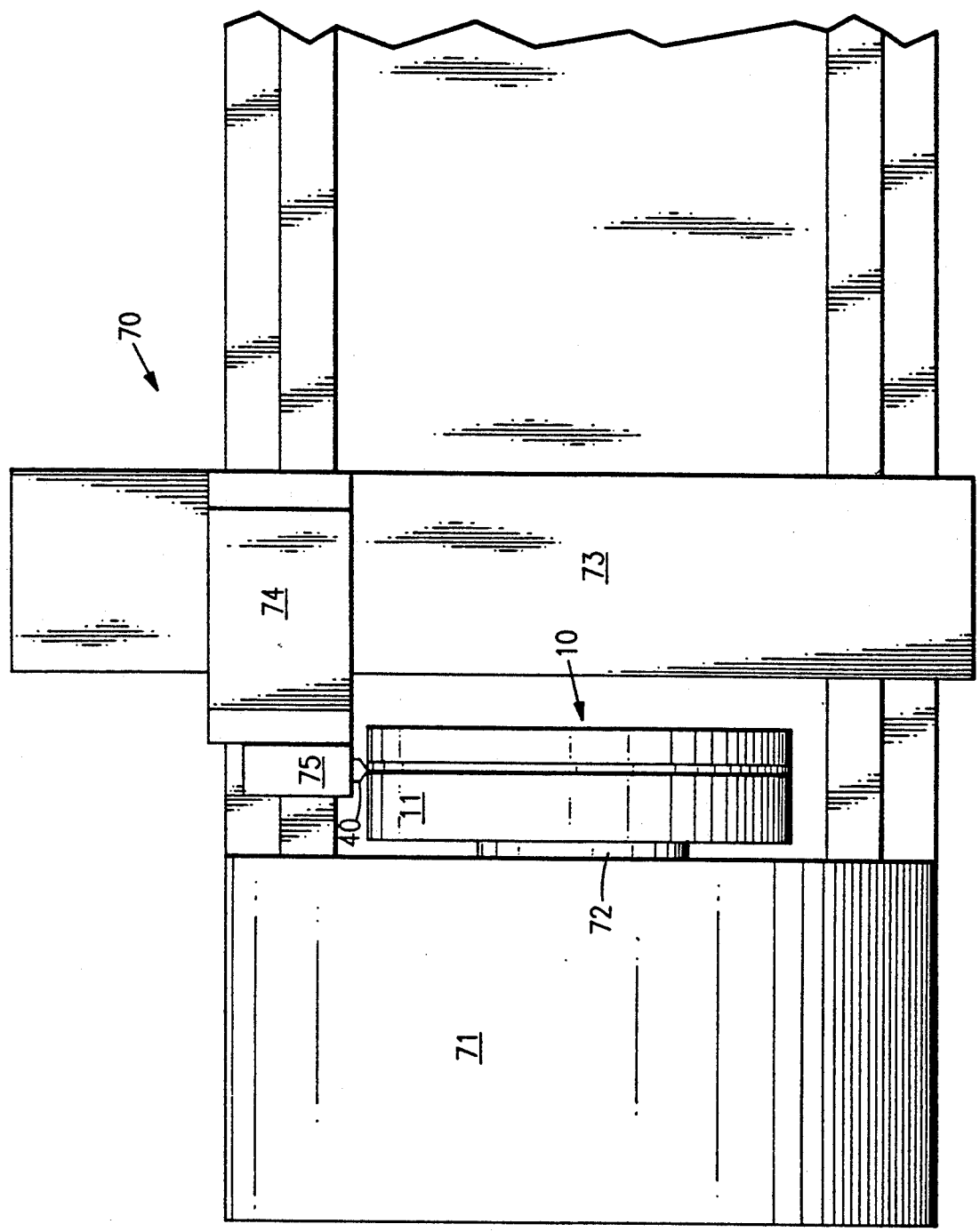
FIG. 9 is a top view of a portion of a lathe.

There are a number of lathes available that have sufficient precision to turn grooves according to the teaching of the present invention. Precision and ultraprecision lathes have the same basic features as conventional lathes and differ from such conventional lathes primarily in the accuracy with which they are able to control the various lathe functions. FIGS. 8 and 9, in partial semi-schematic side elevation and top views, show a grove being cut in circumferential surface 11 of roller 10 by cutting tool 40. Roller 10 is mounted on chuck 72 of lathe 70. Chuck 72 is rotated by a drive (not shown) in headstock 71. Cutting tool 40 is mounted in tool holder 75, which is in turn mounted on crossfeed 74. Crossfeed 74 is mounted on carriage 73. The position and movement of cutting tool 40 with respect to roller 10 are determined by the positions and movements of carriage 73 and crossfeed 74. These positions and movements, in a precision or ultraprecision lathe, are controlled by a computer (not shown).

The work must be precisely positioned on the lathe spindle, then the circumferential surface (12 in FIG. 1) dressed by turning to ensure that the axis of the work is precisely coincident with the axis of rotation of the spindle and that all points on the circumferential surface are equidistant from those axes.

The cutting tool used in the practice of the invention should have a very hard cutting tip. A good choice for the application is a tool having a cubic boron nitride (CBN) tip. FIGS. 5 and 6 respectively show a top and side elevation view of a suitable tool. FIG. 7 shows a detailed view of a portion, denoted by VII in FIG. 5, of the tip of the tool. Tool 40 is prepared from an ISO (International Organization for Standardization) tool VNMA 16048 having a 35° angle (angle $\beta$ in FIG. 7). Base 45 of tool 40 is comprised of a cemented carbide material. Cutting region 41 is comprised of a layer of CBN material 42 affixed to base 45 by a layer of cemented carbide material 43 and a layer of silver brazing material 44. Tip 46 is prepared by a suitable process such as grinding to produce a configuration appropriate to the groove to be turned (Cf. groove 13 in FIG. 3). The dimensions of tip 46 can be very small. One cutting tool successfully used to cut grooves on an embossing wheel has a tip radius (R in FIG. 7) of about 40 microns, an included angle ($\alpha$) of 15° and a cutting depth (D) of about 300 microns.

It is important that, in manufacturing the cutting tool, the tool be precisely symmetrical about axis A. Any asymmetry present can cause side forces during turning that can lead to fracture of the cutting tip.

The properties of the CBN cutting tip must be selected for optimum performance based on the composition of the steel into which the grooves will be turned. A suitable steel for use as an embossing wheel is AISI (American Iron and Steel Institute) D2 tool steel. D2 is a high carbon, high chromium steel having a Rockwell C hardness in the range of 50 to 60. The extremely hard carbide particles in D2 steel are, relatively, very large (on the order of 25 to 500 microns). Some carbide particles thus are larger than the diameter of the tip of the cutting tool. During turning, the force on the tool is very high when it is passing through a carbide particle. The force on the tool is much lower when the tool is passing through the non-carbide matrix of the steel. The variation in cutting forces on the tool subjects it to the possibility of fatigue failure. On steels of this type, the CBN cutting material must have high fracture toughness, at the expense of hardness and wear resistance. On the other hand, turning when a steel having a relatively fine grained carbide content presents a different problem. An example of this type of steel is CPM ® (Crucible Particle Metallurgy) 9V, which has carbide particles of less than 25 microns and a Rockwell C hardness in the range of 53 to 58. When such a steel is turned, the total force required to cut the steel is greater than for a steel such as D2 but the variation in force on the tool as it is cutting is much less. Resistance to fatigue failure is therefore not so significant a consideration but the tool used for cutting in this case should be harder and more wear resistance. A suitable CBN material for cutting grooves in steels such as D2 is General Electric ® B6500. A suitable CBN material for use with CPM ® 9V is DeBeers DBC50.

Critical to the ability to cut grooves of such small dimensions into hard tool steels is the alignment of the cutting tool with respect to the work. The axis (A in FIG. 7) of the tool must be positioned precisely perpendicularly to circumferential surface 12 as the tool is advanced into the work. If the tool axis is not perpendicular to the work during turning, side forces will be present that can easily cause the tool tip to fracture.

Finally, the cutting speed and cutting tool feed rate must be held within limits for success in practicing the method of the invention. Cutting speed, the linear speed of any point on cylindrical surface 12, must be between 80 and 200 meters per minute and preferably about 160 meters per minute. If the speed is less than this range, the wear rate on the cutting tool is excessively high. If the speed exceeds this range, the cutting operation overheats the steel of the work piece, damaging the structure of the steel and altering its strength and other properties. The cutting tool feed rate must be within the range ten to 20 microns per revolution and preferably about 20 microns per revolution. Feed rates less than this range approach the lower limit of the capability of the cutting tool control apparatus and precise control of feed rate is difficult or impossible, leading to sticking or slipping of the tool positioner and an irregular feed of the tool into the work, leading to the possibility of fracture of the tool. Feed rates greater than this range impose loads on the tool that may lead to fracture.

Figure 10:
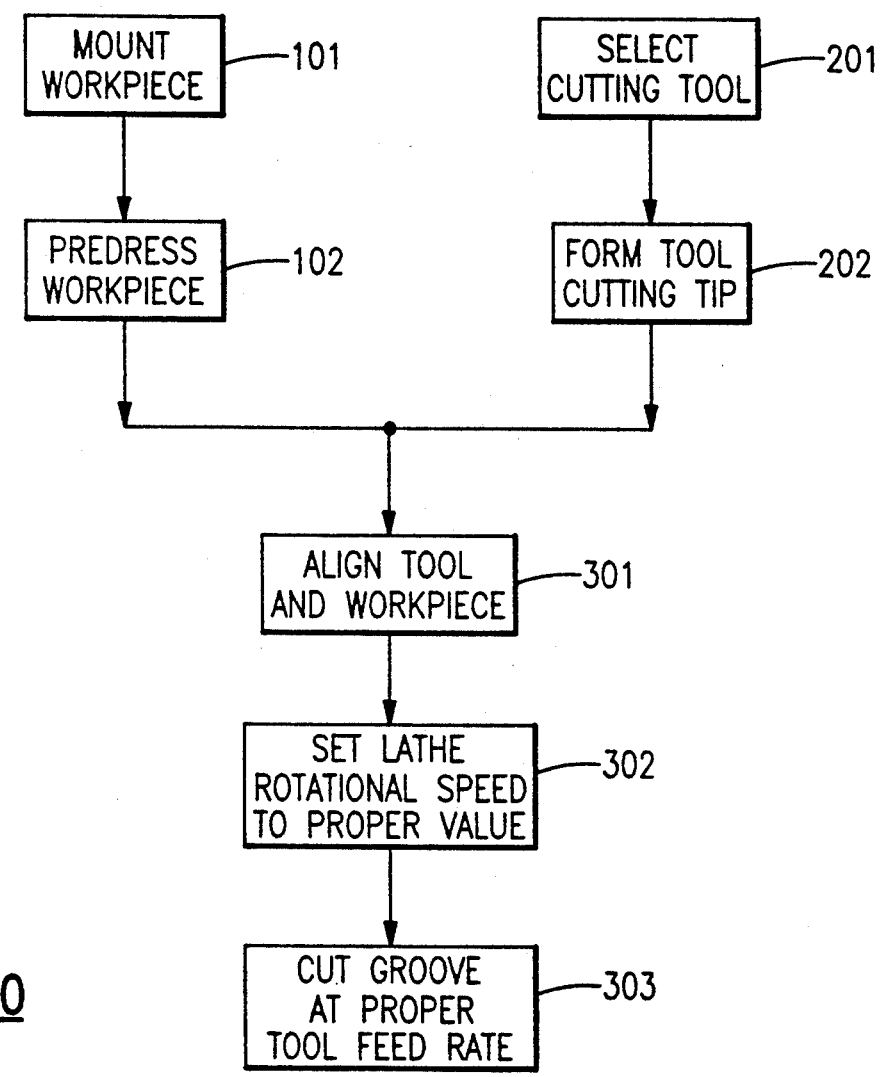
FIG. 10 is a flow diagram of the method of the present invention.

FIG. 10 is a flow diagram showing he steps necessary to practice the method of the present invention. In steps 101 and 102, the workpiece is prepared by mounting it on the lathe chuck and predressing it by turning to remove runout. In steps 201 and 202, a cutting tool having physical properties appropriate to the composition of the workpiece is selected and the tip of the tool is prepared by forming it to the shape necessary to cut the desired groove. In step 301, the cutting tool is aligned so that the longitudinal axis of the tool is precisely perpendicular to the surface into which the groove will be cut. In step 302, the lathe rotational speed is set to the proper speed. Finally, in step 303, the cutting tool is advanced into the workpiece at the proper feed rate to cut the groove. If more than one groove is to be cut into the workpiece, the cutting tool would be moved to the new location and steps 301 through 303 repeated for each groove cut.

The method of the invention offers significant time, and therefore cost, advantages over prior art methods of forming small grooves in a work piece. For example, to lathe turn the grooves in an embossing roller as described in this disclosure, requires about 15 minutes. To accomplish the same task by a grinding method can require up to eight to 10 hours. Further, the grinding process may not be capable of forming grooves of the desired configuration.

I claim:

1. A method, using a precision or ultraprecision lathe, of lathe turning a groove (13) into a circumferential surface (11) of a hardened tool steel workpiece (10) that has been mounted on said lathe and dressed so as to eliminate, within the tolerance limits of said lathe, runout, comprising the steps of selecting a cutting tool (40) having a longitudinal axis (A) and a cutting tip (46) comprised of a cubic boron nitride material according to the criteria
(a) if said hardened tool steel contains relatively large carbide particles (on the order of 25 to 50 microns), select a cutting tip having a cubic boron nitride material having high fracture toughness and
(b) if said hardened tool steel contains relatively smaller carbide particles (less than 25 microns), select a cutting tip having a cubic boron nitride material having high hardness and wear resistance;

forming said cutting tip to a shape suitable to cutting said grove;
aligning said cutting tool with said circumferential surface so that said longitudinal axis is precisely perpendicular to said circumferential surface;
setting the rotational speed of said workpiece so that the linear velocity of a point on said circumferential surface is between 80 and 200 meters per minute; and
cutting said groove into said circumferential surface at a tool feed rate of between five and 20 microns per revolution of said workpiece.

2. The method of claim 1 where said linear velocity is 160 meters per minute.

3. The method of claim 1 where said tool feed rate is 20 microns per revolution.

* * * * *